(12) United States Patent
Rothman et al.

(10) Patent No.: US 7,383,450 B2
(45) Date of Patent: Jun. 3, 2008

(54) LOW POWER FIRMWARE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 11/022,598

(22) Filed: Dec. 22, 2004

(65) Prior Publication Data

US 2006/0136756 A1 Jun. 22, 2006

(51) Int. Cl.
G06F 1/00 (2006.01)
G06F 1/26 (2006.01)
G06F 1/32 (2006.01)

(52) U.S. Cl. ............... 713/300; 713/320; 713/323; 713/330

(58) Field of Classification Search ............ 713/300
See application file for complete search history.

(56) References Cited

U.S. PATENT DOCUMENTS 6,587,951 B1 * 7/2003 Flanigan ............ 713/310
7,082,542 B2 * 7/2006 Cooper ............. 713/320
7,188,262 B2 * 3/2007 Arends et al. ........ 713/300

* cited by examiner

*Primary Examiner*—James K. Trujillo
*Assistant Examiner*—Michael J Brown
(74) *Attorney, Agent, or Firm*—Joni D. Stutman-Horn

(57) ABSTRACT

In some embodiments, the invention involves reducing platform power consumption. In an embodiment, the platform may handle a predetermined set of events by the platform firmware when the platform is in sleep, or low power, mode, thereby eliminating the need to wake the processor and utilize the operating system. Other embodiments are described and claimed.

21 Claims, 5 Drawing Sheets

US 7,383,450 B2

LOW POWER FIRMWARE

FIELD OF THE INVENTION

An embodiment of the present invention relates generally to platform power consumption and, more specifically, to handling a predetermined set of events by the platform firmware when the platform is in sleep mode, thereby eliminating the need to wake the processor and utilize the operating system.

BACKGROUND INFORMATION

Various mechanisms exist for reducing power consumption of a platform. Standard technology for power management is specified in Advanced Configuration and Power Interface (ACPI) version 2.0, which may be found on the public Internet at URL www-acpi-info (note that periods have been replaced with dashes to avoid unintentional hyperlinks in this document). ACPI is the standard most computer systems currently use for power management and is used to describe how the system looks to the operating system. Power management capabilities enable a platform, both at component and system level, to change its operating state to use less power and to resume normal operations. These modes of operation are often called sleep and wake modes. A number of events may trigger a platform to transition to low power state or to transition from a low power state to a more active state. For instance, moving a mouse, pressing a key on the keyboard or receiving a message may cause a platform to transition to an active state from a sleep, or low power, state.

The role of firmware in power management has been typically that the firmware can communicate with the hardware. The firmware may initiate stand-by or wake events. Often the policy of whether an event should wake or sleep the platform is dictated by the operating system (OS). The firmware will comply with the OS policy.

A typical scenario in existing systems is described herein. The platform is powered up. The firmware initializes the subsystem and eventually loads the OS. While the OS is running, at some point in time, a sleep event is triggered in the platform, perhaps due to time, or inactivity, or user-selection. The OS may trigger a system management interrupt (SMI) to cause a sleep event. The firmware acts upon the SMI and recognizes that the platform is to be put into sleep mode. The firmware initiates sleep mode. The chipset for the platform is programmed to recognize certain actions for triggering wake events. When an event causing a wake event is recognized, the firmware operates once again to wake the platform. The waking of a platform may be similar to boot up, but varies according to ACPI standards. Memory contents should still be intact and the operational context should be maintained. If the processor was in sleep mode, upon waking, the processor resets and re-launches the firmware. The firmware can detect that it is not in boot up mode, because in some sleep modes, memory remains intact. Thus, the firmware executes a process dedicated to waking the platform rather than rebooting it. The firmware will not reinitialize memory, for instance. Once awakened, the firmware transitions control to the operating system.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to using platform firmware to perform selected events without operating system (OS) interaction. In at least one embodiment, the present invention is intended to reduce power consumption by enabling the platform to exist in low power modes, or sleep mode, for extended periods of time.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
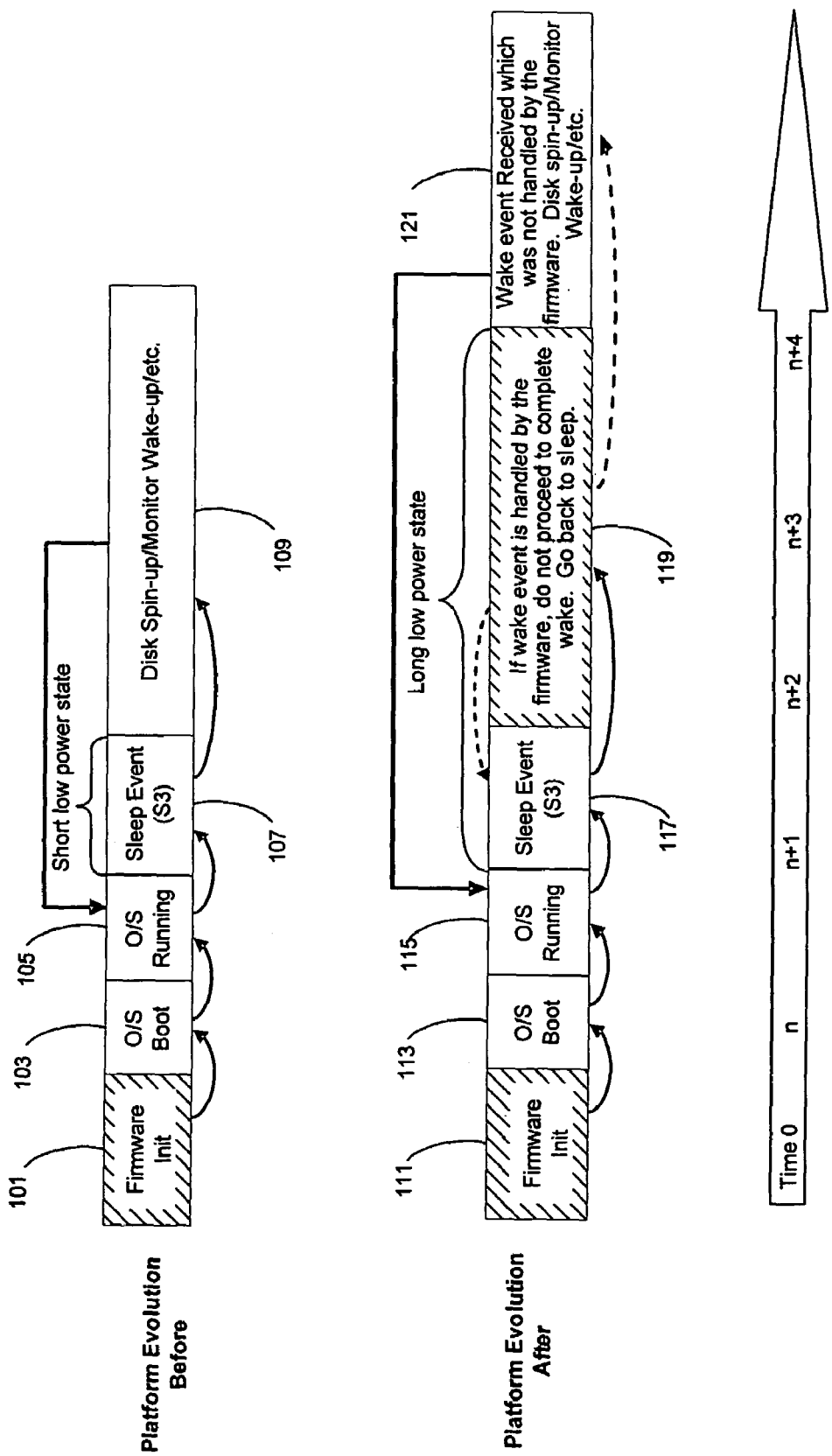
FIG. 1 is a block diagram illustrating a comparison of low power states in existing systems and an embodiment of the present invention.

FIG. 1 illustrates a typical sleep/wake scenario according to an embodiment of the invention compared to that of existing systems. In existing systems, a platform is initialized by the firmware 101. The operating system (OS) is booted 103. The OS runs normally in wake mode 105 until a sleep event 107 causes the platform to sleep. A wake event occurs 109 and causes the platform to spin-up the disks and fully wake the platform. In this system, the platform uses minimum/low power only during the sleep event 107.

As described herein, in an embodiment, the platform's low power state may be extended to reduce overall power consumption. As in existing systems, a platform is initialized by the firmware 111. The operating system (OS) is booted 113. The OS runs normally in wake mode 115 until a sleep event 117 causes the platform to sleep. However, a wake event may be received that does not cause the platform to fully restore wake mode. If the wake event is to be handled by the firmware 119, as determined by platform policy, then the firmware wakes only the components necessary to handle the event and then resumes sleep mode 117. If the wake event is not to be handled by the platform 121, then the disks may be spun up, the monitor may be turned on, and the platform may be restored to full wake mode with all components powered up. It may be seen that the described embodiment reduces power consumption by extending low power mode for some wake events.

Figure 2:
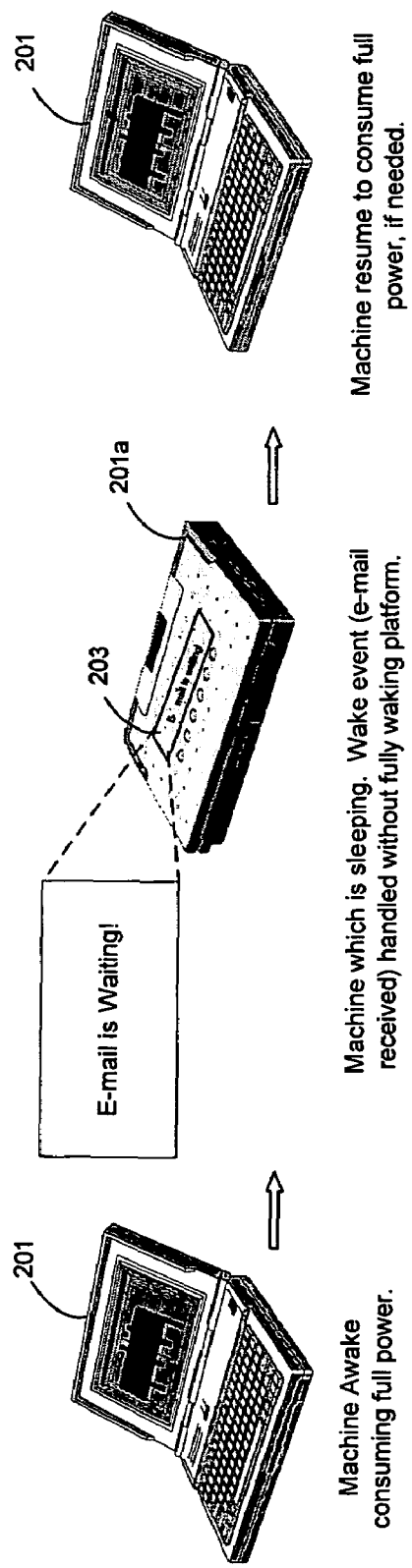
FIG. 2 is a block diagram illustrating the notification of e-mail messages without waking the platform, according to an embodiment of the invention.

Embodiments of the system and method described herein enable a platform to perform some tasks without emerging completely from sleep mode, thereby reducing power consumption. For instance, a user may wish to be notified of the receipt of e-mail, but may not wish the platform to spin-up the disk drives, monitor or other devices. FIG. 2 illustrates a sleeping platform 201a having a separate display 203 to indicate that an e-mail message has arrived. The platform 201 operates normally when in wake mode. If, for example, the platform 201a is in sleep mode, the user may not want the platform to fully wake when an e-mail arrives. In this case, the firmware may be designed to send a message to a separate display 203 when e-mail arrives. The user will then have the option of waking the platform to read the e-mail, or delay reading it until later. A variety of wake events may be set in a policy. For instance, receipt of e-mail, receipt of other messages or network transmission, mouse movement, keyboard activity, periodic wake, etc.

Often, the OS does not need to be involved in the receipt of an e-mail to notify the user. An e-mail is basically a series of network packets received on a network interface card (NIC), either wired or wireless. The OS does not need to be aware of the e-mail. Some events may trigger wake of firmware, for instance, to wake on a periodic basis to check for e-mail, but not to wake the entire platform or OS. The hard drive, video and other components may remain in sleep mode while performing the e-mail check. In some embodiments, the platform is awakened at its slowest state, or a state that uses a minimum of power. The firmware may handle the wake event without OS operation. Once the operation is complete, the platform may be put back into sleep mode.

Figure 3A:
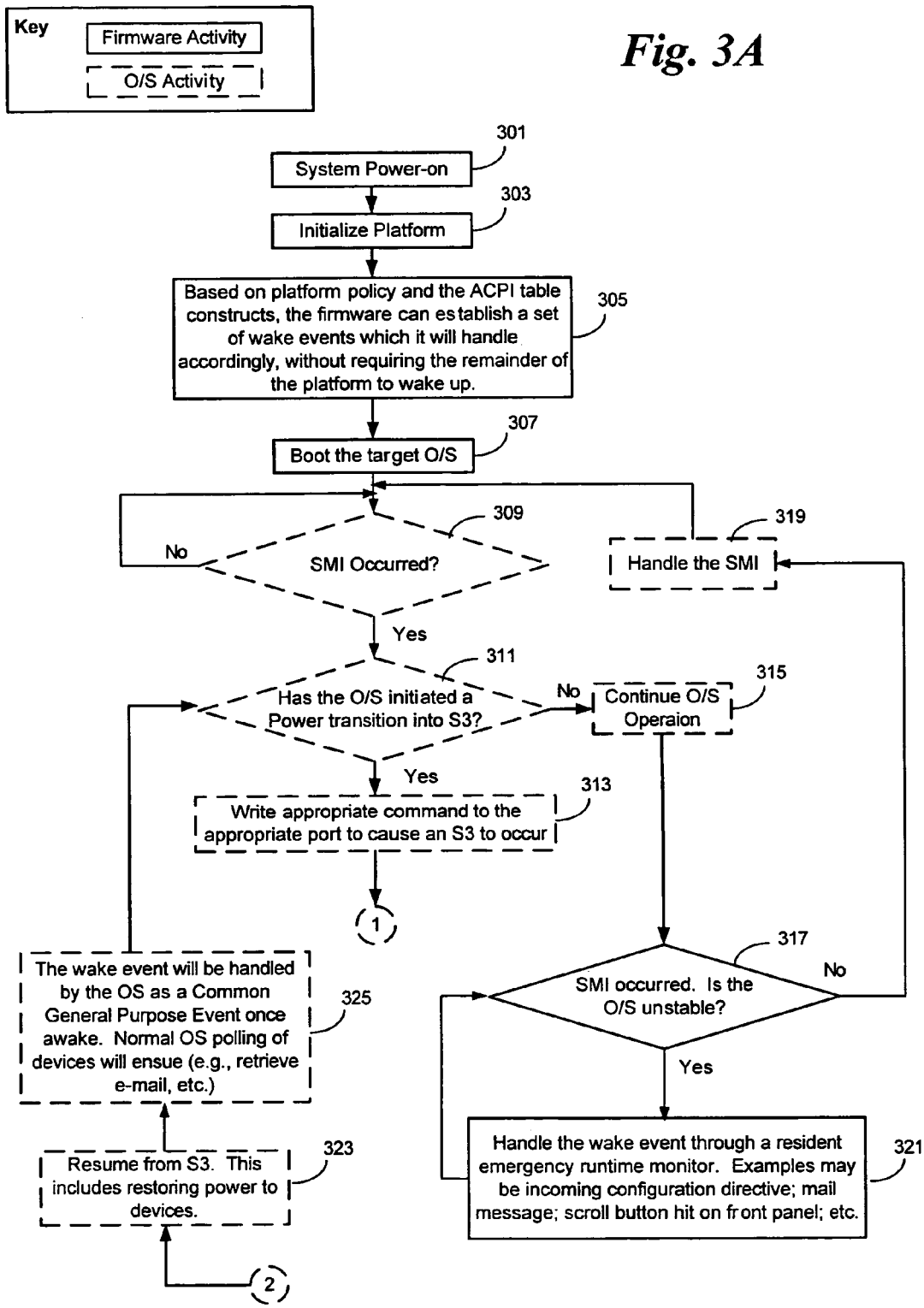
FIGS. 3A and 3B are flow diagrams illustrating an exemplary method for performing selected wake events without operating system intervention, according to an embodiment of the invention.
Figure 3B:
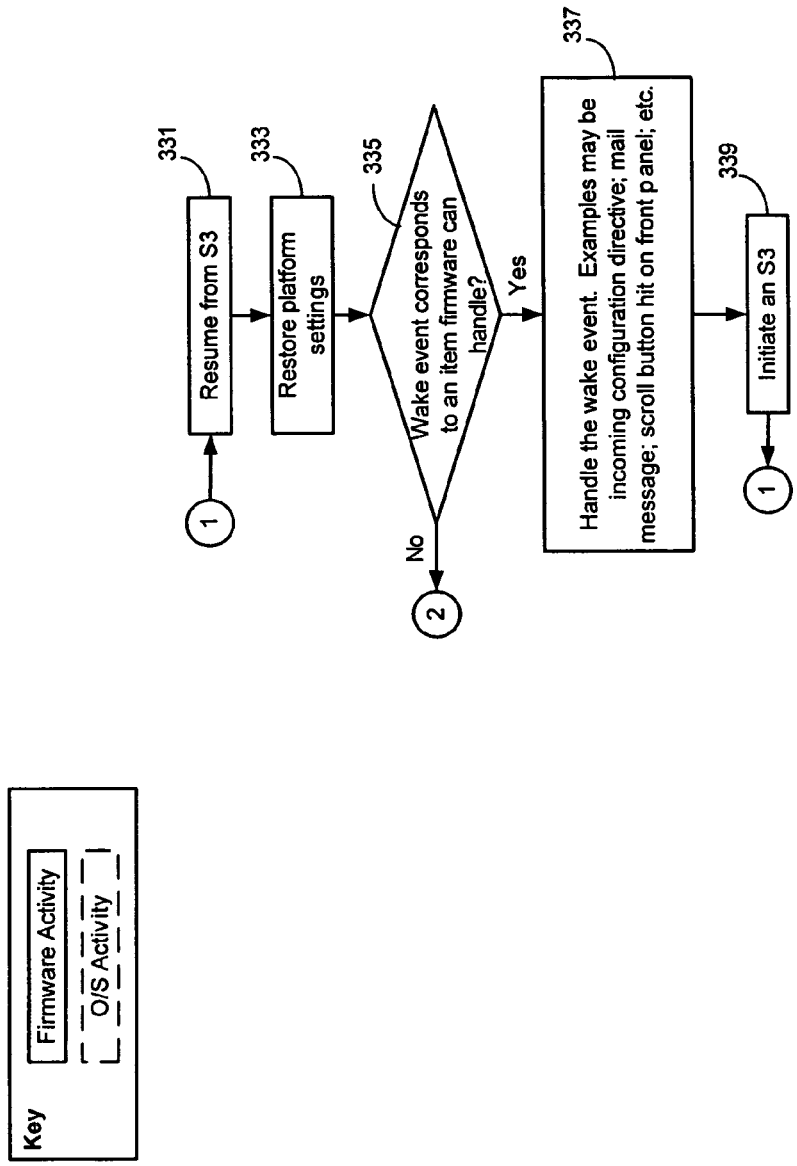

FIGS. 3A and 3B show an exemplary method for executing wake events, according to an embodiment of the invention. In these figures, blocks outlined by a solid line are typically performed by the firmware. Blocks outlined with a broken line are typically performed by the OS. It will be apparent to one of ordinary skill in the art that the term "performed by the firmware" is shorthand for a more complex platform interaction. In a typically single processor system, for instance, instruction execution is typically performed by the main processor, or central processing unit (CPU). "Performed by the firmware" may mean that non-operating system instructions are fetched from a non-volatile memory store (firmware), coupled to the processor and then executed by the processor. The processor has access to the firmware prior to loading the OS. Thus, boot instructions are typically stored in the firmware boot block. In some embodiments, the boot block resides remotely, and the "boot block" contains a pointer to the remote location. Further, when the platform is in a low power mode, i.e., sleep mode, the OS is non-functional. Wake events trigger execution of instructions stored in the firmware before optional transfer to the OS.

Referring now to FIG. 3A, a platform implemented with an embodiment of the present invention is powered on in block 301. The platform is initialized by the boot block firmware in block 303. Other portions of the firmware, residing outside of the boot block, may play a role in initialization. The boot block is typically responsible for early aspects of initialization such as early memory initialization and central processor initialization. Initialization may include identifying and resetting memory, identifying devices and components coupled to the platform, etc.

Based on platform policy and ACPI table constructs, the firmware may establish a set of wake events to be handled accordingly by the firmware rather than the OS, in block 305. The policy may be standard and shipped with the platform, or may be determined by a system administrator or the like. Policies may be stored in a platform's non-volatile RAM (NVRAM), for instance, flash memory. Policies may be embodied in NVRAM variable settings contained in the flash device. Wake events are typically programmed by the firmware into the platform's chipset. Events such as touching the keyboard, receiving a network packet of a certain type, etc., could be programmed as wake events. The selected wake events may be captured by the chipset and communicated to the firmware. Wake events may be initiated by system management interrupts (SMIs), control line changes, register flags, or other constructs. In other cases, wake events are initiated by the chipset and cause an SMI. Some wake events may trigger powering up the platform to be handled by the OS, and some wake events are selected to be performed by the firmware while the platform is still basically in sleep mode. Any event that requires only operation of a processor and not spinning up a hard drive or other component may be a candidate for execution during sleep mode.

Once the wake policy has been set, the firmware boots the OS in block 307. Normal operation of the platform commences, under control of the OS. The OS continues normal operation until an SMI, or other event, has occurred, as determined in block 309. If an SMI has occurred, then a determination is made in block 311 whether the OS has initiated a power transition to a lower power state, typically sleep mode S3. Embodiments of the invention are herein described illustrating sleep mode S3. However, it will be apparent to one of ordinary skill in the art that embodiments may be implemented for other low power modes.

If a sleep state has not been transitioned, then OS operation continues as normal in block 315. However, an SMI has been received and must be acted upon. A determination is made as to whether the OS is unstable in 317. If not, then SMI is handled in block 319 and OS operation continues until another SMI has been received, as determined in 309. If the OS is unstable, then the SMI/wake event may be handled by a resident emergency runtime monitor in block 321. The emergency runtime monitor (ERM) is a firmware construct. The ERM is a monitor of events that may run in the runtime environment and can be used for the handling of non-standard events by the firmware. Examples of wake events to be handled are incoming configuration directives, incoming e-mail messages, scroll button hit on front panel, etc. During normal operation, a periodic check may be made to identify wake events (317). As wake events are received, they may be handled by the resident emergency runtime monitor.

When the OS initiates a sleep mode transition, or transition to lower power mode, as determined in block 311, the appropriate command may then be written to a port to cause the transition, in block 313. Power level transitioning is typically defined by ACPI standards.

Referring now to FIG. 3B, a wake event which would normally cause the platform to resume from sleep mode to wake mode for handling, is received in 331. The platform settings may be restored in 333. A determination is made by the firmware, in block 335, whether the wake event corresponds to an event firmware can handle. The firmware compares the event received with the predetermined platform policy to make this determination. If the event cannot be handled by the firmware, then the platform resumes from the low power state to an active state in block 323 (FIG. 3A). This may include restoring power to devices and components of the platform. The wake event may be handled by the OS as a Common General Purpose Event, once awake, in block 325. Normal OS polling of devices will ensue, e.g., retrieve e-mail, etc. A determination is then made as to whether the OS has initiated a power transition to sleep mode in block 311. Depending on the type of wake event received, the platform may immediately transition back to sleep mode, or remain awake, for instance, if the event was a keyboard event.

If the policy indicated that the firmware can handle the event (FIG. 3B, 335), then the event is handled by the firmware without waking the entire platform in block 337. In some embodiments, only the processor is powered up to handle the event. In other embodiments, selected components are powered up, but the platform is not brought to a full active state. Once the event has been handled, the platform may transition back into the low power, or sleep, mode in block 339 until another wake event has been detected.

Figure 4:
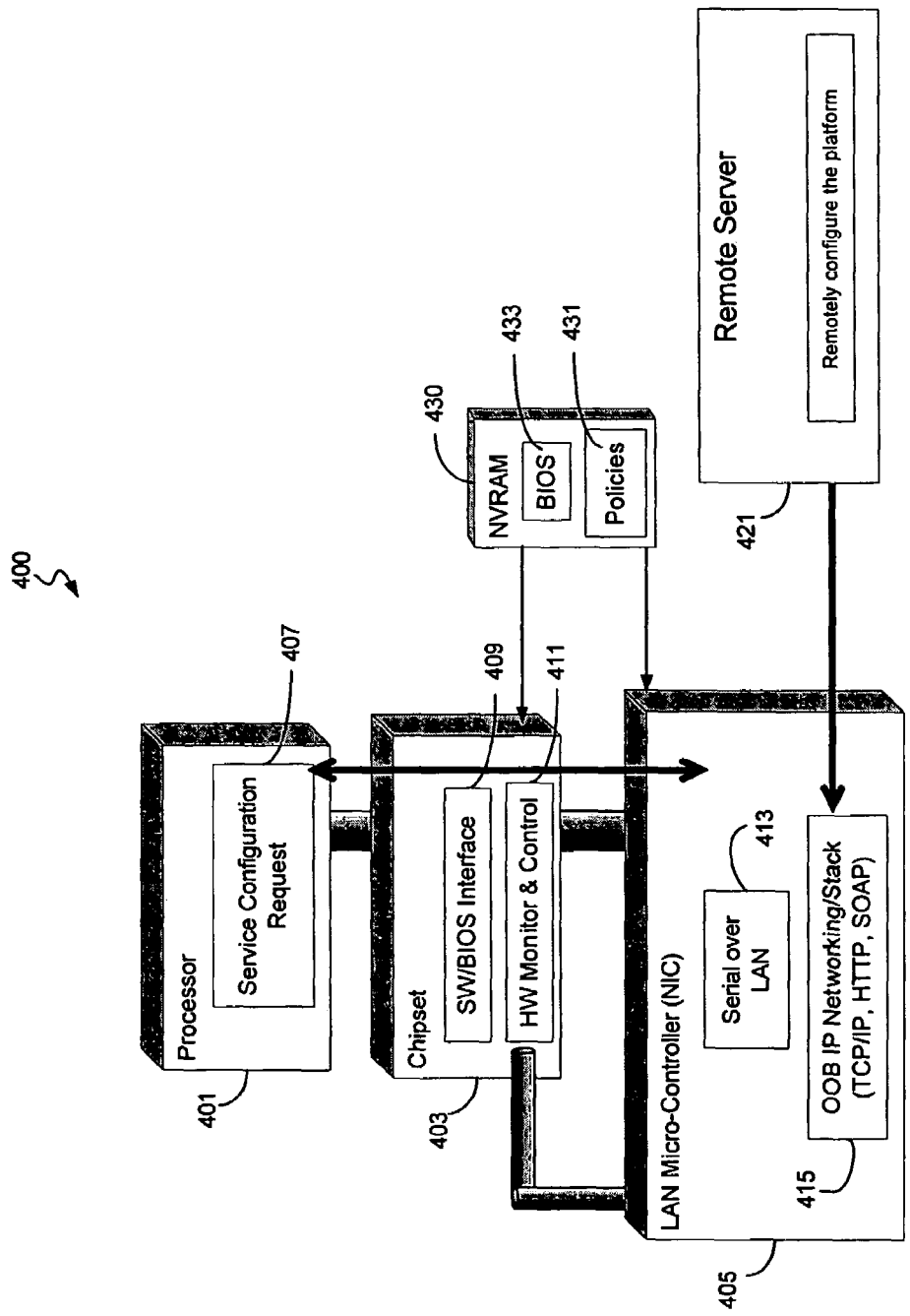
FIG. 4 is block diagram illustrating an exemplary platform environment in which an embodiment of the present invention may reside.

FIG. 4 illustrates an exemplary platform environment in which an embodiment of the present invention may reside. In an embodiment, the platform 400 may receive configuration messages, e.g., containing service configuration requests 407, from a remote server 421. The service configuration requests 407 are to be executed on the processor 401. An embedded network interface card (NIC) may be able to handle and analyze packets to trigger events based on the incoming packet type. An administrator may send a configuration packet recognized by the microcontroller 405. In existing systems, an a administrator sends configuration requests 407 when the platform is up and running. In an embodiment of the invention, the platform receives a configuration packet while in sleep mode. In existing systems, the platform may act on configuration requests only while in wake mode, i.e., up and running.

In an embodiment, a platform 400 comprises a processor 401, a chipset 403, a non-volatile RAM memory (NVRAM) 430, such as flash memory, and an optional embedded microcontroller 405 which may be a network interface card 405. Processor 401 may be any type of processor capable of executing software, such as a microprocessor, digital signal processor, microcontroller, or the like. Though FIG. 4 shows only one such processor 401, there may be one or more processors in the platform 400 and one or more of the processors may include multiple threads, multiple cores or the like.

The microcontroller 405 may comprise a network interface card (NIC) or the like. The NIC 405 may be communicatively coupled to a remote server 421 via a serial over local area network (LAN) interface 413 or an out of band (OOB) connection 415. The OOB 415 may utilize Transfer Control Protocol/Internet Protocol (TCP/IP), hypertext transfer protocol (HTTP) or Simple Object Access Protocol (SOAP), or other protocol. The NIC 405 may use other means to communicate over a network, for instance, Integrated Drive Electronics (IDE) redirection (not shown) or other means.

The chipset 403 typically has a software interface for the basic input output system (BIOS) 409 and hardware monitor and control means 411. The chipset is communicatively coupled to the NIC 405 and the processor 401. Both the chipset 403 and the NIC 405 may be coupled to the NVRAM 430 enabling them to access the wake event policies 431. The SW/BIOS interface 409 may retrieve BIOS instructions 433 from the firmware (NVRAM 430). The BIOS 433 may contain a portion comprising boot instructions, including partial boot for full wake, and a portion comprising a wake event handler to handle wake events not causing a full power up of the platform. When a wake event is received the SW/BIOS interface 409 causes the wake event handler to be executed. When the platform is booted or fully awakened, the SW/BIOS interface may cause the boot portion to be executed. When fully awakened, the platform omits specific boot instructions that are meant for full platform boot only.

The SW/BIOS interface 409 may further comprise pre-execution (PXE) drivers for the NIC 405 and other devices. By using PXE drivers, the platform 400 can communicate with a network without requiring an OS agent. The PXE driver for the NIC 405 may use a network mini-stack rather than a full network stack. This means that all protocols may not be implemented on the stack. This may reduce the size and complexity of the PXE drivers.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
    a processor in a computing platform, the platform capable of transitioning to and from a lower power mode, wherein the lower power mode is an operational mode; and
    a firmware communicatively coupled to the processor and a chipset, the firmware comprising, a boot portion and an event handling portion, wherein the event handling portion is to handle a plurality of wake events, and to identify a subset of the plurality of wake events, the subset of wake events to be performed without transitioning the platform to highest power mode,
    wherein the event handling portion handles the identified subset of wake events without operating system interaction, and wherein the event handling portion forwards other wake events to the operating system for handling.

2. The system as recited in claim 1, wherein the firmware further comprises wake event policies, the wake event policies for use in identifying the subset of the plurality of wake events.

3. The system as recited in claim 2, wherein wake event policies define a first set of wake events to be handled by the event handling portion and a second set of wake events to be handled by the operating system.

4. The system as recited in claim 3, wherein the plurality of wake events are triggered by the chipset.

5. The system as recited in claim 1, wherein a subset of the identified
    plurality of wake events are to transition, the platform to a higher power mode, the higher power mode being lower than the highest power mode, and
    wherein execution of the identified wake events wakes, or powers up, only components necessary to handle the identified wake event and after executing the identified wake event is to resume sleep mode.

6. The system as recited in claim 5, wherein the higher power mode enables notification to a user that a wake event has occurred, the notification being performed without operating system interaction.

7. The system as recited in claim 1, wherein the identified subset of the plurality of wake events include a selected one of receiving a network transmission, receiving an e-mail, sensing input data received to an input device, or receiving a configuration directive.

8. The system as recited in claim 1, wherein the event handling portion is to reinitiate a lower power mode after handling a wake event.

9. The system as recited in claim 1, wherein the plurality of wake events comprises configuration requests sent to the processor from a remote server.

10. A method, comprising:
    receiving a wake event; by computing platform firmware;
    determining a power level of the platform;
    if the determined power level is a low power state, wherein the low power state is an operational state, then determining whether the received wake event is to be handled directly by the firmware; and
    handling the wake event by one of the firmware and operating system, wherein selection of the firmware and operating system is based on the determined power level and whether the wake event is to be handled directly by the firmware,
    wherein handling of the wake events when the determined power state is in a low power state comprises waking or powering up only components necessary to handle the wake event and after handling the wake event, resuming the power state to the previously determined low power state.

11. The method as recited in claim 10, wherein handling the wake event by the firmware further comprises:
    retrieving a platform wake event policy; and
    determining whether the wake event is to be handled by the firmware based on the retrieved wake event policy.

12. The method as recited in claim 10, wherein the wake event is triggered by a chipset on the platform, the chipset being coupled to the platform firmware.

13. The method as recited in claim 10, further comprising, if the determined power level is not a low power state, causing the operating system to handle the wake event.

14. The method as recited in claim 10, wherein handling the wake event by the operating system further comprises:
    transitioning the platform to a higher power state;
    resuming the operating system; and
    handling the wake event by the operating system.

15. The method as recited in claim 14, wherein handling the wake event by the operating system further comprises determining whether the platform should be transitioned to a lower power state after handling the wake event by the operating system, and if so, then transitioning the platform to the determined lower power state.

16. The method as recited in claim 15, wherein transitioning the platform to a lower power state comprises transitioning the platform to sleep mode.

17. A machine accessible medium having instructions that when accessed cause the machine to:
    receive a wake event, by computing platform firmware;
    determine a power level of the platform;
    if the determined power level is a low power state, wherein the low power state is an operational state, then determine whether the received wake event is to be handled directly by the firmware; and
    handle the wake event by one of the firmware and operating system, wherein selection of the firmware and operating system is based on the determined power level and whether the wake event is to be handled directly by the firmware,
    wherein handling of the wake events when the determined power state is in a low power state comprises instructions to wake or powerup only components necessary to handle the wake event and after handling the wake event, resume the power state to the previously determined low power state.

18. The medium as recited in claim 17, further comprising instructions that when handling the wake event by the firmware, further cause the machine to:
    retrieve platform wake event policy; and
    determine whether the wake event is to be handled by the firmware based on the retrieved wake event policy.

19. The medium as recited in claim 17, wherein the wake event is triggered by a chipset couple to the platform firmware.

20. The medium as recited in clam 17, further comprising instructions that when the determined power level is not a low power state, cause the operating system to handle the wake event.

21. The medium as recited in claim 17, wherein handling the wake event by the operating system further comprises instructions that cause the machine to:
    transition the platform to a higher power state; and
    resume the operating system.

* * * * *